United States Patent [19]

Takagi

[11] Patent Number: 4,558,903
[45] Date of Patent: Dec. 17, 1985

[54] ANGLE ADJUSTMENT DEVICE OF A MOVABLE BODY FOR A VEHICLE SEAT

[75] Inventor: Genziro Takagi, Akishima, Japan

[73] Assignee: Tachikawa Spring Co., Ltd., Tokyo, Japan

[21] Appl. No.: 534,910

[22] Filed: Sep. 22, 1983

[51] Int. Cl.⁴ ............................................... A47C 7/36
[52] U.S. Cl. .................................... 297/408; 297/429; 297/284; 297/356
[58] Field of Search .............. 297/408, 429, 433, 356; 74/540, 535, 538

[56] References Cited

U.S. PATENT DOCUMENTS

| | | | |
|---|---|---|---|
| 773,720 | 11/1904 | Drury | 297/357 |
| 970,635 | 9/1910 | Matthes | 297/356 |
| 2,217,352 | 10/1940 | Todd et al. | 297/356 X |
| 2,257,150 | 9/1941 | Beeson | 297/433 |
| 2,828,810 | 4/1958 | Barecki et al. | 297/408 |
| 4,191,064 | 3/1980 | Houk et al. | 74/538 |
| 4,370,898 | 2/1983 | Maruyama | 297/408 |

Primary Examiner—Francis K. Zugel
Attorney, Agent, or Firm—Cushman, Darby & Cushman

[57] ABSTRACT

An angle adjustment device is disclosed in which the angle of inclination of a headrest or thigh support can be adjusted by rotating a movable body itself forming a part of the headrest or thigh support. When the movable body is rotated, sectors fixed to the movable body are rotated together with the movable body and are engaged with a stopper rod secured to a bracket. Thus, the sectors are locked in a desired position, that is, the angle of the movable body is adjusted. When the movable body is rotated beyond a predetermined angle of rotation, the sectors are disengaged out of the stopper rod and the movable body is rotated in an opposite direction so as to return to its initial position.

5 Claims, 8 Drawing Figures

ANGLE ADJUSTMENT DEVICE OF A MOVABLE BODY FOR A VEHICLE SEAT

BACKGROUND OF THE INVENTION

1. Field of the Invention

The present invention relates to an angle adjustment device of a movable body included in a headrest or thigh support for a vehicle seat which is advantageous in that the angle adjustment of the headrest or thigh support can be carried out by means of direct operation thereof.

2. Description of the Prior Art

Conventionally, there has been well known in the art a movable body of a headrest or thigh support for a vehicle seat arranged such that its angle of inclination can be adjusted according to the physique, preference or reclining opertions of a particular occupant. However, in spite of several advantages, such a conventional movable body also presents some problems. For example, since the conventional movable body is constructed such that the adjustment and locking operations of its inclination angle are performed by use of a knob, lever or similar operation members mounted onto the side portion of the headrest or thigh support, it is complicated in structure and is poor in operationability.

SUMMARY OF THE INVENTION

The present invention is directed to overcome the above mentioned drawbacks in the prior art movable body for a vehicle seat. According to a preferred embodiment of an improved headrest of the present invention, the headrest itself is directly rotated so that it can be firmly locked stepwise in a predetermined angle and also that it can be automatically returned to its initial position when rotated to its final or maximum angular position.

The foregoing and other objects are achieved in accordance with the present invention by providing an angle adjustment device which comprises a bracket fixed to a fixing member of a seat, sectors fixed to a movable body, and an engagement mechanism interposed between said bracket and sectors. The engagement mechanism is adapted to be engaged stepwise with the sectors while the movable body is rotated in one direction and to be disengaged out of said sectors when said movable body is fully rotated to an extreme end position of rotation so that the movable body becomes free to rotate in the other direction.

According to the invention, the movable body and thus the headreast can be directly rotated so as to adjust its angle of inclination, and, therefore, there is no need for mounting any operation member such as a knob and lever onto the side portion of the movable body and thus the side portion of the headrest, which provides an enhanced safety for a seat occupant.

The present invention will be better understood by reference to the attached drawings, taken in conjunction with the following description thereof.

DETAILED DESCRIPTION OF THE PREFERRED EMBODIMENT OF THE PRESENT INVENTION

Figure 1:
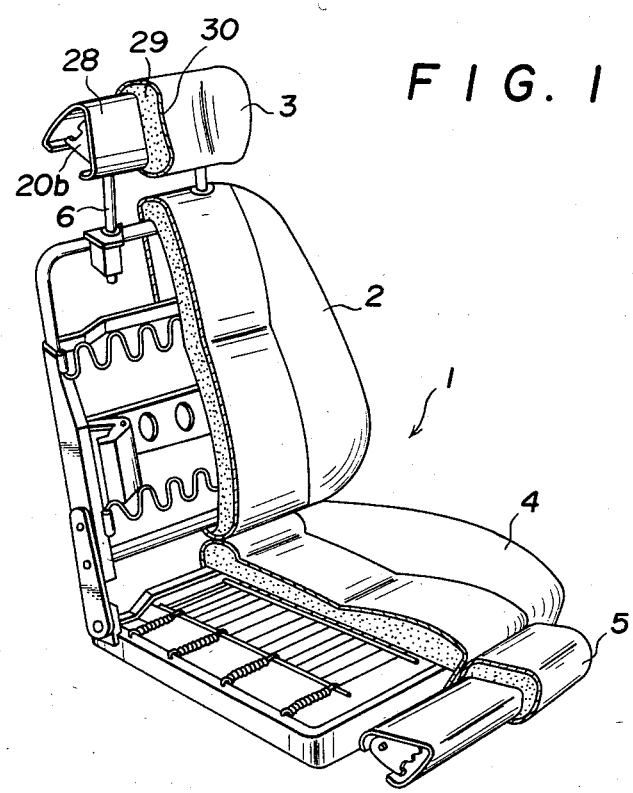
FIG. 1 is a perspective view, partially in section, of a vehicle seat with a movable body to which an angle adjustment device of the present invention is applied.
Figure 3:
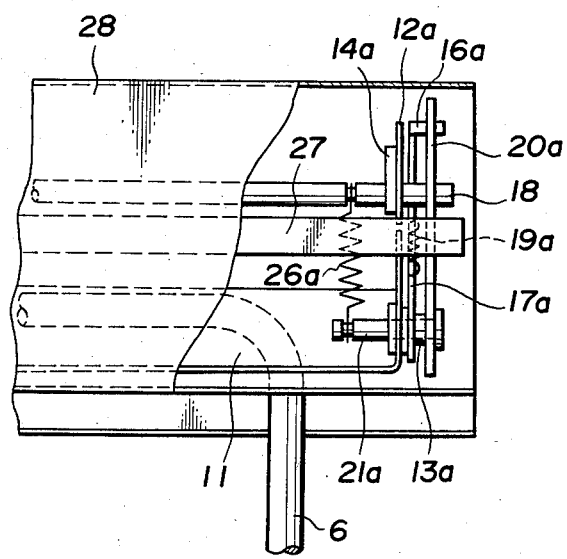
FIG. 3 is a front view, partially in section, of one half section of the headrest according to the present invention in its assembled condition.

FIG. 1 illustrates a vehicle seat (1) which comprises a seat back (2) with a headrest (3) mounted thereto and a seat cushion (4) with a thigh support (5) mounted to the front portion thereof, with both of the headrest (3) and thigh support (5) employing the present invention.

Since the headrest (3) and thigh support (5) have respective movable bodies which are substantially similar in structure, in FIGS. 2-5, only the structure of the headrest (3) will be described hereinafter.

In the drawings, (11) designates a bracket to be fixed to a support rod (6), the bracket including right and left walls (12a)(12b). These walls are provided at their respective first ends with tubular bearings (13a)(13b) extending therefrom, and in their second ends there are formed slots (14a)(14b) being elongated in a direction of said first ends or said bearings. These bearings (13a)(13b) journal or support the bottom end portions of transfer arms (17a)(17b) having hook portions (15a)(15b) and stop members (16a)(16b) at their respective top end portions which correspond to the outer end portions of said slots (14a)(14b), respectively. A stopper rod (18) is extended through and supported tranversely by said slots (14a)(14b). Between substantially the central portions of the transfer arms (17a)(17b) and the side walls (12a)(12b) of the bracket (11) there are extended springs (19a)(19b) so that the transfer arms (17a)(17b) are constantly biased in a direction of the elongated slots (14a)(14b), that is, they are biased rotatively to cause the hook portions (15a)(15b) to be engaged with the stopper rod (18).

Also, on the side walls (12a)(12b) of the bracket (11) are supported sectors (20a)(20b) with shaft pins (21a)(21b) extending from the respective bottom end portions by inserting said shaft pins (21a)(21b) through the internal bores of the bearings (13a)(13b). These sectors are provided at their respective top edges with toothed portions (22a)(22b) which respectively correspond to the respective inner end portions of the elongated slots (14a)(14b), with their tooth forms being configured such that the toothed portions can be engaged only when the head rest (3) is rotated in one direction (i.e. counterclockwise in FIG. 4). At the end portions where the sector toothed portions (22a)(22b) are standing up there are formed cam edges (23a)(23b) which are higher than the crest of the tooth. At both ends of the toothed portions there are integrally projected limit arms (24a)(24b) and (25a)(25b) extending from the outer end portions of the elongated slots (14a)(14b). Between the ends of the shaft pins (21a)(21b) of the sectors (20a)(20b) and the stopper rod (18) there are extended springs (26a)(26b) so that the stopper rod (18) is constantly biased in a direction of the inner ends of the elongated slots (14a)(14b), that is, it is biased so as to be engaged with the sector toothed portions (22a)(22b).

The sectors (20a)(20b) are connected by means of a connecting piece (27) so that they secure a movable body, namely, a frame (28) of the headrest in this embodiment. On the outer peripheral surfaces of this frame (28), as shown in FIG. 1, there is arranged a pad member (29) such that it encloses the bracket (11). The pad member (29) is covered by a top layer (30). In this way, the headrest (3) of the invention is formed.

Figure 4:
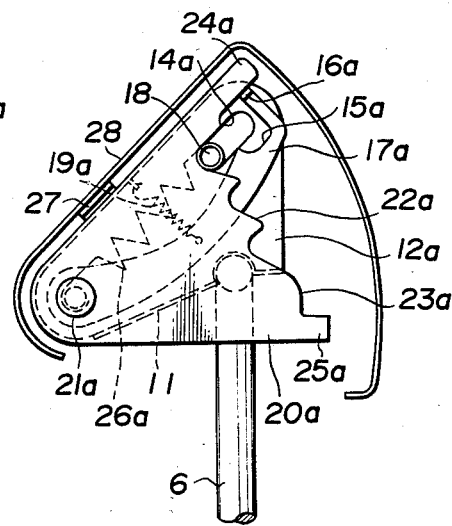
FIG. 4 is a side elevation view of the headrest according to the invention; and, FIGS. 5(A), 5(B), 5(C), and 5(D) are respectively side elevation views of the headrest of the invention while it is in operation.
Figure 2:
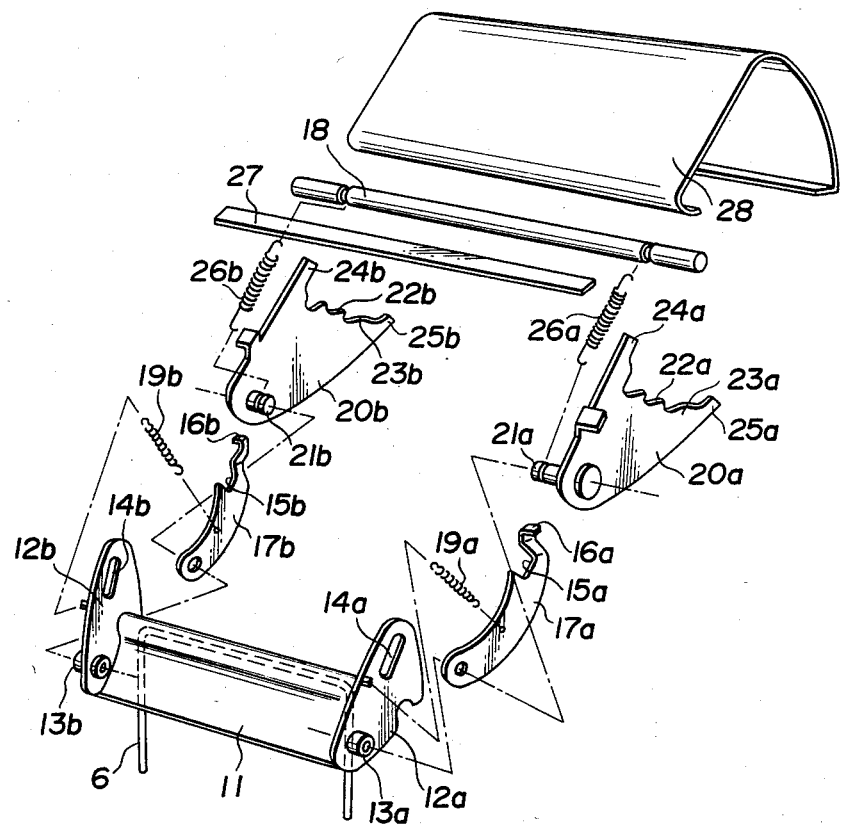
FIG. 2 is an exploded, perspective view of a headrest to which the present invention is applied.

Next, the operation of the headrest arranged as above will be described. FIG. 4 illustrates a state in which the headrest (3) is inclined to the maximum relative to the surface of the seat back. In this state, the ends at the upper side (namely, the first tooth bottoms) of the sector toothed portions (22a)(22b) of the sectors (20a)(20b) are respectively engaged with the stopper rod (18), and, with the stop members (16a)(16b) of the arms (17a)(17b) being abutted against the limit arms (24a)(24b) at the upper side of the sectors (20a)(20b), the transfer arms (17a)(17b) are so engaged so to keep the hook portions (15a)(15b) away from the stopper rod (18).

Figure 5A:
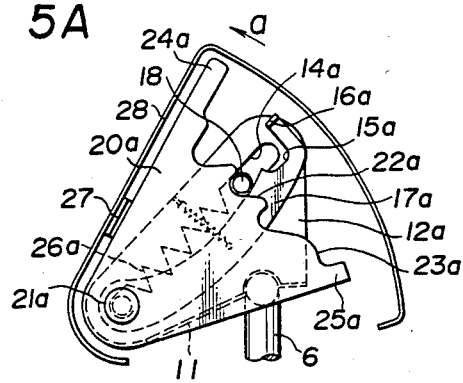

In this condition, if the headrest itself, that is, the frame (28) in FIG. 4, is pivoted in the direction of arrow 'a' shown in FIG. 5A or its raising direction, then the sectors (20a)(20b) are rotated together with the frame (28) about the journalled or supported portion where the shaft pins (21a)(21b) are inserted through the bearings (13a)(13b) of the bracket (11), so that the first tooth crests of the sector toothed portions (22a) (22b) push the stopper rod (18) against the biasing forces of the springs (26a)(26b) to move it along the elongated slots (14a)(14b), and finally climb over the stopper rod (18), causing the second tooth bottoms to be engaged with the stopper rod (18). Thus, the frame (28) along with the sectors (20a)(20b), in this position, is maintained in such a state that it is prevented from rotating in the opposite direction of the arrow 'a' as can be seen by reference to FIGS. 5A and 5B. 'a'. In this state, the arms (17a)(17b) are abutted against the stopper rod (18) along their respective edge portions ranging from the hook portions (15a)(15b) to their bottom ends (FIG. 5A).

Figure 5B:
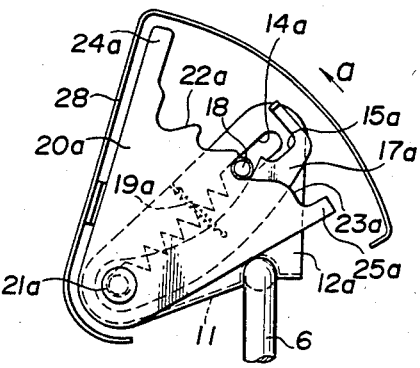

In this way, if the frame (28) is further rotated in a direction of the arrow 'a', then the third tooth bottoms of the sector toothed portions (22a)(22b) of the sectors (20a)(20b) are engaged with the stopper rod (18) (FIG. 5B). Thus, in this manner, the angle of inclination of the headrest (3) relative to the seat back (2) can be varied in its raised direction.

Figure 5C:
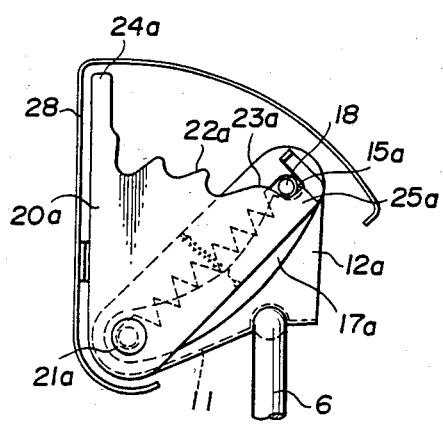
Figure 5D:
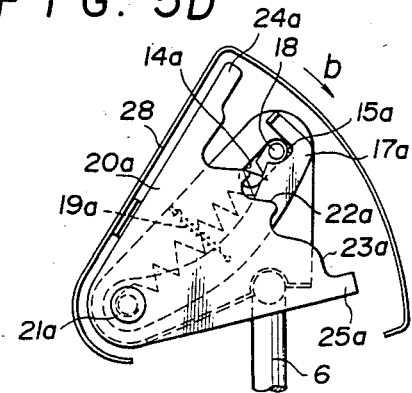

During such rotation, when the frame (28) is rotated to the maximum, that is, when it is raised and rotated to a plane substantially flush with the surface of the seat back (2) as shown in FIG. 5C the cam edges (23a)(23b) of the toothed portions (22a)(22b) of the sectors (20a)(20b) apply a force to the stopper rod (18) to move it toward the outer ends of the elongated slots (14a)(14b). Consequently, the hook portions (15a)(15b) of the arms (17a)(17b) are engaged with the stopper rod (18) and at the same time the securing pieces (25a)(25b) of the sectors (20a)(20b) are abutted against it, so that the frame (28) is prevented against further rotation in a direction of the arrow 'a' (FIG. 5C).

In the state shown in FIG. 5C, the stopper rod (18) is engaged with with the hook portions (15a)(15b) of the arms (17a)(17b) and thus it is separated from and kept outwardly of the toothed portions (22a)(22b) of the sectors (20a)(20b), so that the engagement of the sector toothed portions (22a)(22b) is released. As a result, the sectors (20a)(20b) are now rotatable in a lowering direction (the opposite direction of the arrow 'a'). Accordingly, the frame (28), along with the sectors (20a)(20b), can be rotated in its lowering direction (e.g. the direction of arrow 'b' in FIG. 5D). If it is lowered to the extreme end, then the limit arms (24a)(24b) of the sectors (20a)(20b) are respectively abutted against the stop members (16a)(16b) of the arms (17a)(17b) to push and rotate the arms (17a)(17b) in the lowering direction (i.e. the direction of arrow b) against the biasing forces of the springs (19a)(19b) causing the stopper rod (18) to be disengaged from the hook portions (15a)(15b). Consequently, the stopper rod (18) is moved inwardly along the elongated slots (14a)(14b) due to the biasing forces of the springs (26a)(26b) and then is engaged with the first tooth bottoms of the toothed portions (22a)(22b) of the sectors (20a)(20b) that is, the stopper rod (18) returns to the state shown in FIG. 4. This lowering operation of the frame (28) can be performed automatically by mounting a return spring (not shown) between the bracket and sectors.

With the above mentioned operation, the angle of inclination of the headrest (3) relative to the seat back (2) can be adjusted selectively and variably. A fine adjustment of this angular position of inclination can be achieved by increasing the number of teeth of the toothed portions (22a)(22b) of the sectors (20a)(20b).

Although in the above mentioned arrangement the arms (17a)(17b) and sectors (20a)(20b) are provided symmetrically at both sides of the bracket (11), they also may be located only in one side of the bracket and thus the frame (28) may also be secured only to the one side of the bracket (11), with the other side being used as a free hinge. Also, although the headrest (3) can be adjusted relative to the seat back (2) in height as well, since this height adjustment mechanism is not directly related to the present invention, special explanation about such mechanism is duely omitted here.

As described hereinbefore, an embodiment of the present invention applied to the headrest (3) has been illustrated and explained, however it is quite clear to those skilled in the art that the invention can also be applied to the thigh support (5) which is mounted, as shown in FIG. 1, in the front portion of the seat cushion (4) so as to adjust the height of legs of an occupant from a floor surface of a vehicle, and also that the components of the thigh support (5) can be substantially the same as those of the above mentioned headrest (3) except that they are different in size from each other.

In accordance with the present invention, an angle adjustment device is arranged as above so as to be applicable in common to both movable bodies of a headrest and a thigh support for a vehicle seat, so that it is possible to variably adjust the inclination angle of the headrest or thigh support by rotating the movable body itself directly without operation of a lever or knob. Accordingly, the present invention permits a positive and simple adjustment operation of the angular position which suits best the physique and preference of the occupant and is also more advantageous in safety because no lever or knob is provided in the movable body.

What is claimed is:

1. An angle adjustment device for a movable body of a vehicle seat comprising:

a bracket adapted to being rigidly fixed to the vehicle seat;

a frame for the movable body;

sector plate means for pivotally mounting said frame to said bracket, said frame and sector plate means thus being pivotally movable relative to said bracket about a pivot axis between first and second extreme positions, said sector plate means including first and second radially spaced-apart limit arms which respectively establish said first and second extreme positions, and means defining plural teeth for establishing respective pivot positions intermediate said first and second extreme positions, engagement means operatively associated with said bracket for sequentially engaging said defined plural teeth when said sector plate is pivotally moved in a first pivotal direction, said engagement means including (a) means defining an elongate slot in said bracket radially extending from said pivot axis, (b) rod means for engaging said defined teeth and being slidably displaceable within said slot between an advanced position wherein said rod means is engaged with a predetermined one of said defined teeth to prevent pivotal movement of said sector plate means relative to said bracket in a second pivotal direction, opposite to said first pivotal direction, and a displaced position wherein said rod means is disengaged from said defined teeth and (c) biasing means for biasing said rod means into said advanced position, said sector plate means also including means defining a raised cam edge at said second extreme position for responsively displacing said rod means from said advanced position and into said displaced position when said sector plate means is pivotally moved in said one pivotal direction and into said second extreme position, said rod means abutting against said second limit arm when said sector plate means is in said second extreme position; and transfer arm means having one end pivotally connected to said bracket so as to be pivotal in said first and second pivotal directions about said pivot axis, the other end of said transfer arm means defining a holding portion positioned laterally of said slot relative to said second pivotal direction, said transfer arm means including spring means exerting a bias force tending to pivot said transfer arm means in said first pivotal direction, and stop means projecting forwardly of said holding portion relative to said first pivotal direction and engageable with said first limit arm, said holding portion being in registry with said rod means which said rod means is in said displaced position at said second extreme portion of said sector plate means which permits said transfer arm means to pivot in said first pivotal direction thereby releasably capturing said rod means in said holding portion to releasably maintain said rod means in said displaced position, said sector plate means being thereafter freely pivotal from said second extreme position to said first extreme position in said second pivotal direction, said stop means for engaging said first limit arm during a latter portion of pivotal movement of said sector plate means from said second extreme portion to said first extreme position, said first limit arm responsively pivoting said transfer arm means upon continued pivotal movement of said sector plate in said second pivotal direction to release said rod means from said holding portion to thereby enable said biasing means to move said rod means from said displaced position and into said advanced position such that said rod means abuts against said first limit arm whereby said sector plate is in said first extreme position.

2. An angle adjustment device as in claim 1 further comprising a pad covering said frame.

3. An angle adjustment device as in claim 1 wherein said bracket includes at least one support post to attach the movable body to a vehicle seat.

4. An angle adjustment device as in claim 1 wherein the movable body is a head rest.

5. An angle adjustment device as in claim 1 wherein the movable body is a thigh support.

* * * * *